Aug. 8, 1967  S. E. A. ENGLUND ET AL  3,335,297
PUNCHED CARD PROCESS CONTROL APPARATUS
Filed July 8, 1964  4 Sheets-Sheet 1
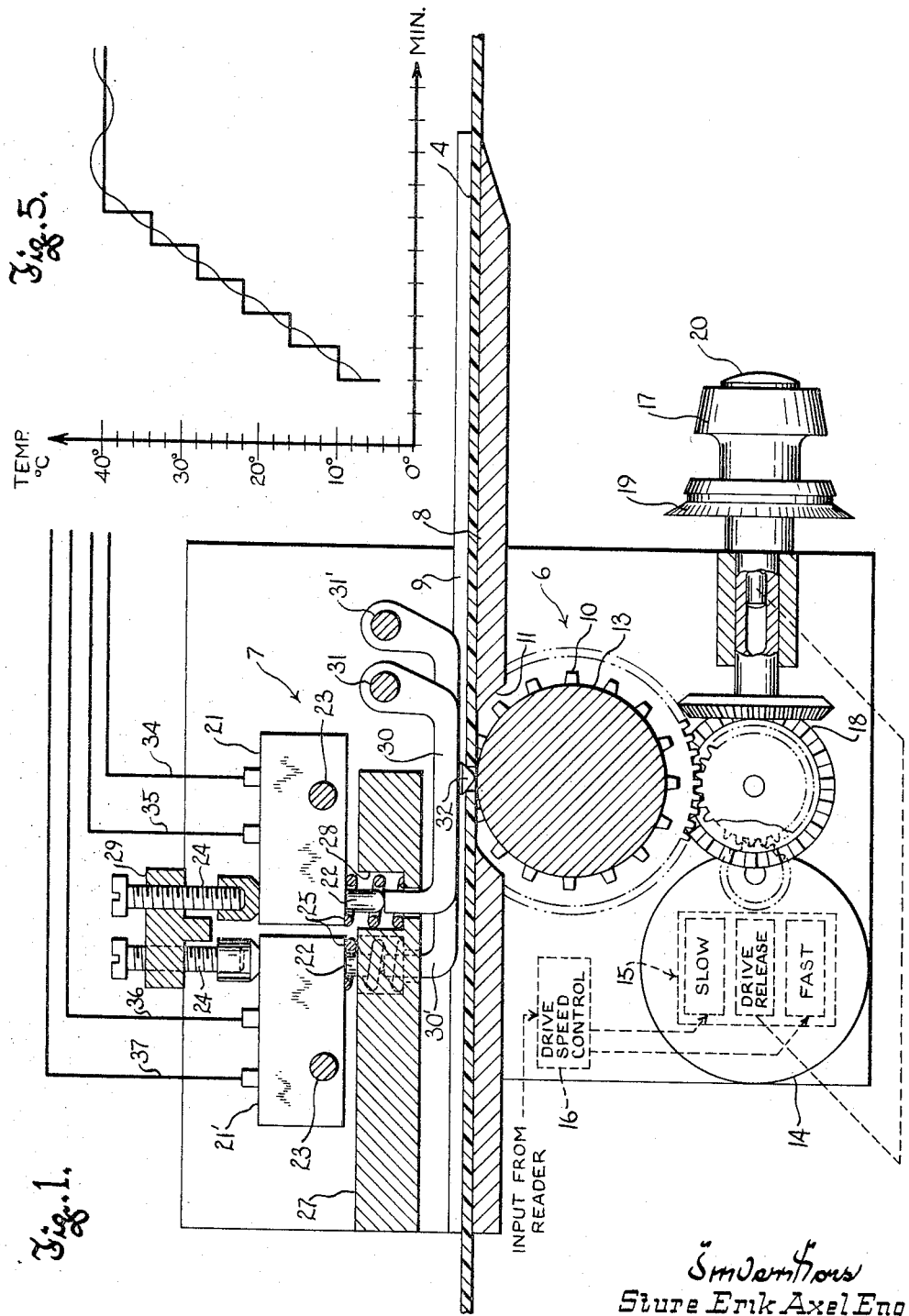
Inventors
Sture Erik Axel Englund
Sture Ingvar Axelsson
Torsten Vilhelm Andersson

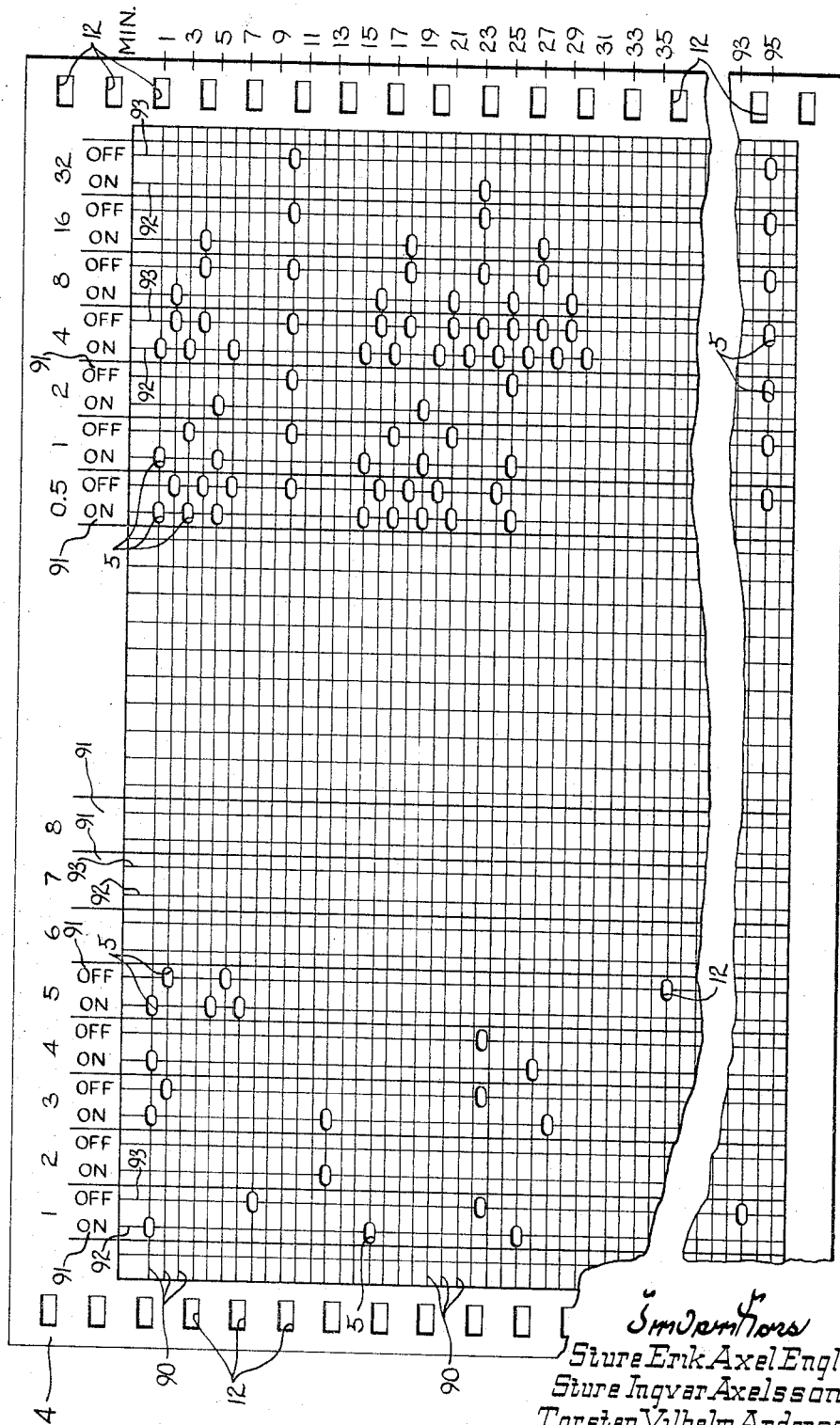

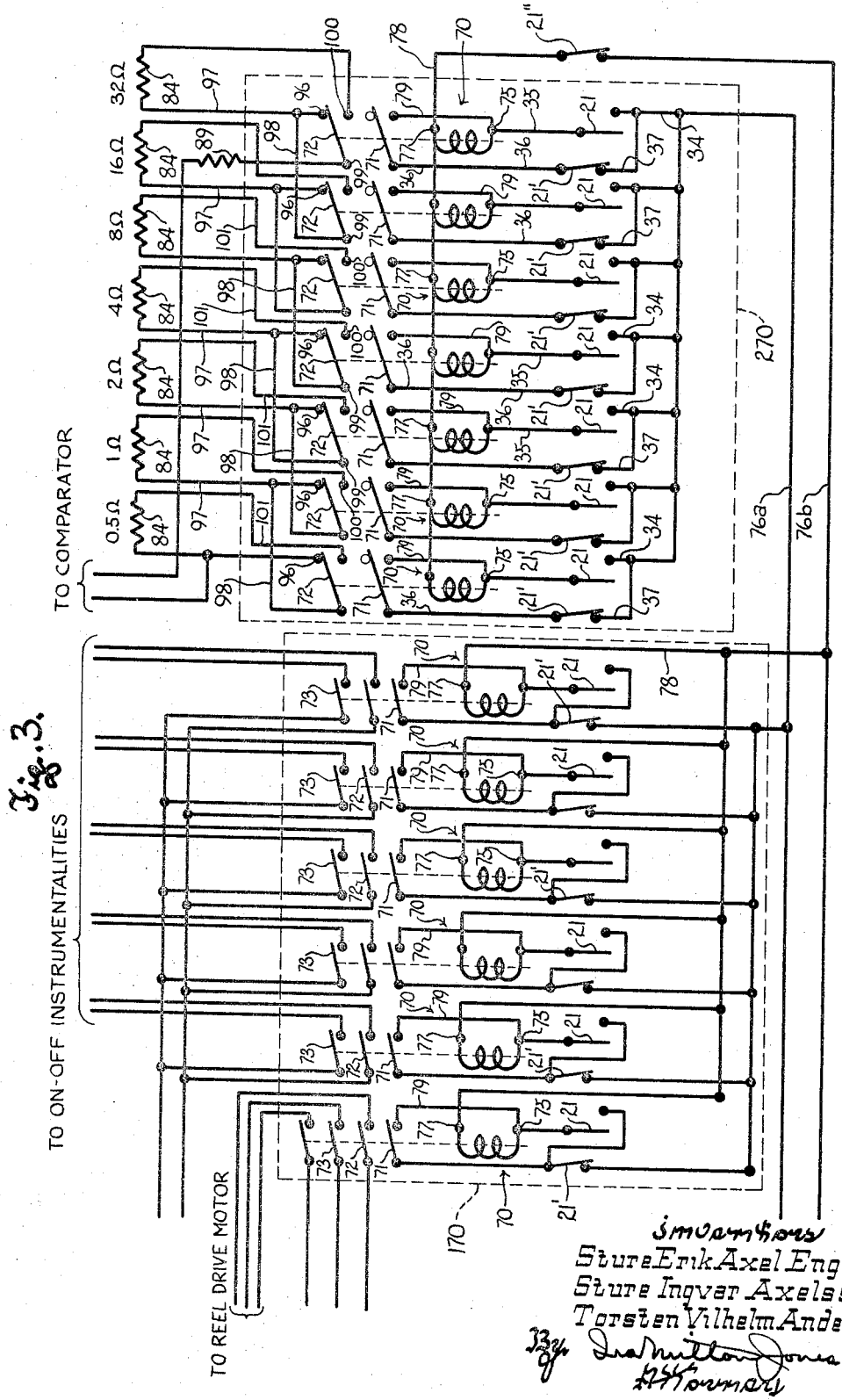

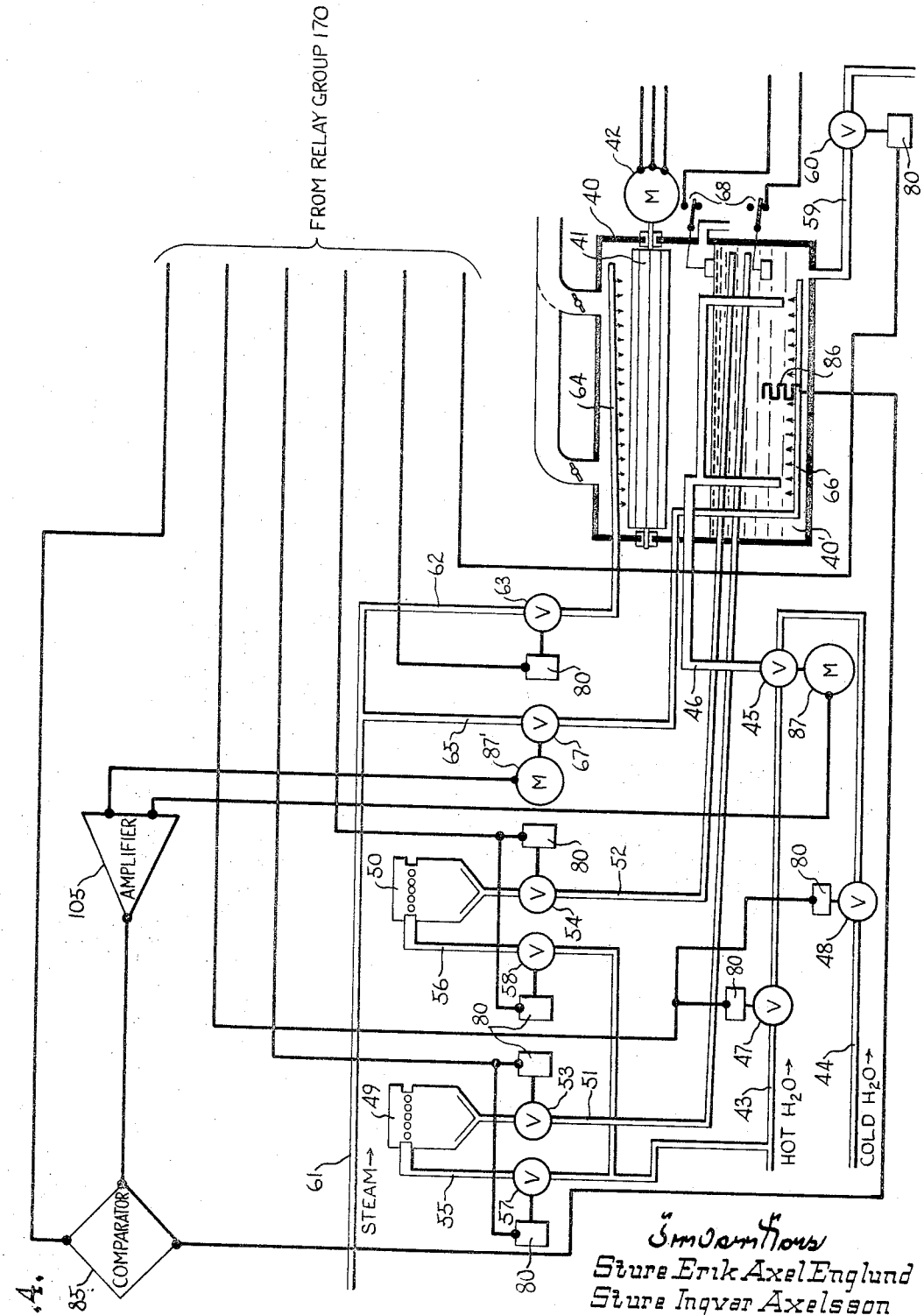

United States Patent Office 3,335,297
Patented Aug. 8, 1967

3,335,297
PUNCHED CARD PROCESS CONTROL
APPARATUS
Sture Erik Axel Englund, Sture Ingvar Axelsson, and Torsten Vilhelm Andersson, Jonkoping, Sweden, assignors to SAAB Aktiebolag, a corporation of Sweden
Filed July 8, 1964, Ser. No. 381,206
4 Claims. (Cl. 307—112)

ABSTRACT OF THE DISCLOSURE

A program carrier having binary indicia that can be uniform in all respects except location on the carrier is moved continuously through a reader to produce "on" and "off" impulse signals by which self holding relays are energized and deenergized. Each relay, when energized, connects in a demand circuit one of a number of different demand value output producing elements. The total demand value output thus obtained is constantly compared with a feedback corresponding to the actual value of the variable characteristic being controlled. An error signal proportional to the difference between demand value output and feedback is imposed upon a servo that effects change in the characteristic.

---

This invention relates to apparatus for the control of a process by means of a program carrier such as a punched card, and the invention pertains more particularly to apparatus wherein a program carrier upon which a schedule is encoded in binary indicia as employed to control the rate of change of a variable characteristic of a medium so that the medium has preselected values of said characteristic at predetermined times in accordance with the schedule encoded on the program carrier.

There are many processes in which some variable characteristic of a medium must be changed at a specified rate during a particular stage of the process or must be changed at different rates during different stages of the process. For example, in a chemical process the temperature, pH or solution concentration of a liquid medium might have to be varied at a specified rate during one phase of the process or during the whole thereof, or the temperature or pressure of a gaseous medium might have to be changed at a substantially steady rate from one specified value to another during the course of a certain time interval. Often such changes must be cordinated with other changes in a medium or media involved in the process, or with operations that must be performed by the machinery for accomplishing the process. Under these conditions human supervision and control of the processing machinery may require a high order of skill, coordination and attention if all of the control operations and adjustments are to be performed in the right sequence and at the right times.

Textile dyeing is an example of a process which involves such situations. At various times during the course of a dyeing process it may be necessary to effect changes in both the temperature and the degree of concentration of the dye bath in accordance with a prescribed schedule, and the complete program for the process may include a number of other operations, such as the opening and closing of valves in the processing equipment, which must be performed at rigidly prescribed times during the process. Obviously it is desirable to automate such a process as far as possible, not only to reduce the labor required for its performance but, more important, to eliminate the chances for errors in the sequencing and timing of the various operations.

With these considerations in mind, it is the general object of the present invention to provide apparatus for so controlling changes in a variable characteristic of a medium during a predetermined time period as to cause said characteristic to attain predetermined values at predetermined times during said period in accordance with a schedule that is encoded on a program carrier in groups of binary indicia.

From the foregoing statement of the general object of the invention it will be apparent that the invention contemplates apparatus having certain elements which are of the binary type. A binary element is one that is either "on" or "off" or which is in some other manner alterable only to one or the other of two conditions that are essentially opposites or alternatives. Hence each indicium on the program carrier in the apparatus of this invention denotes an alteration in the condition of a binary element in the apparatus.

It follows that it is another object of this invention to provide process control apparatus of the character described wherein a schedule of operations can be encoded on a program carrier in the form of binary indicia which signify demand values for the characteristic of the medium to be controlled, and wherein all such indicia can be uniform in all respects except location on the program carrier, comprising for example punched holes of identical shape and size.

Another object of this invention is to provide apparatus for controlling change in a variable characteristic of a medium in accordance with a program encoded on a lengthwise movable program carrier in transversely aligned binary indicia groups, wherein each indicia group signifies a demand value for the characteristic and the spacing between each indicia group and its next succeeding indicia group along the length of the carrier denotes the time interval during which the demand value signified by the first named indicia group shall obtain.

A further object of this invention resides in the provision of process control apparatus of the character described wherein a program carrier such as a punched card or magnetic tape, upon which a program is encoded in binary indicia, so controls changes in a variable characteristic of a medium as to provide the medium with preselected values of said characteristic at predetermined times during the process, and also effects other operations of an on-off character in a machine controlled by the apparatus to accomplish such other operations at the times when they are required, even though such operations may have to occur simultaneously with changes in a value of said characteristic of the medium.

It is also an object of this invention to provide apparatus for changing a variable characteristic of a medium in accordance with a schedule encoded on a program carrier in binary indicia, which apparatus comprises a plurality of control elements, each alterable between operative and inoperative conditions and each operable to produce an output different from the others, wherein the output of each control element corresponds to a demand value increment and is applied to the adjustment of an adjustable instrumentality which produces said characteristic, so that the magnitude of adjustment of the instrumentality at any given time depends upon the conditions of the several control elements, and so that changes in the adjustment of the instrumentality are effected in accordance with the schedule encoded on the program carrier.

A more specific object of this invention is to provide apparatus of the character described which is adapted for cooperation with an easily prepared program carrier upon which a program can be punched or otherwise delineated by means of very simple and inexpensive equipment.

It is also a specific object of this invention to provide apparatus of the character described wherein a program covering a time interval of substantially long duration can be encoded on a program carrier which is unusually compact, by reason of the fact that the program carrier can contain indicia signifying rate instructions for a feed mechanism which moves the program carrier past a reader, by which instructions the program carrier is caused to move at a slow rate when a long time interval is to elapse between successive operations denoted thereon and at a faster rate when operations denoted on the program carrier are to occur in rapid sequence.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a vertical sectional view of a mechanism comprising a reader for a program carrier of this invention and feed means for moving the program carrier past the reader so that indicia on the program carrier can be detected by the reader;

FIGURE 2 is a plan view of one form of program carrier for cooperation with the apparatus of this invention comprising a card having a program encoded thereon in the form of punched holes;

FIGURE 3 is a diagram of a portion of the apparatus of this invention which cooperates with the reader and which comprises, generally speaking, output producing means controlled by the reader in cooperation with a program carrier presented to the reader;

FIGURE 4 is a more or less diagrammatic view of a processing machine controlled by the apparatus shown in FIGURES 1, 2 and 3, and comprising instrumentalities responsive to the output producing means shown in FIGURE 3, feedback means, and comparator means; and FIGURE 5 is a graph showing changes of temperature in a dye bath as produced under the control of apparatus of this invention in accordance with a portion of the program encoded on the program carrier illustrated in FIGURE 2.

In the following description the invention is explained, for purposes of illustration, in its application to a machine for accomplishing a textile dyeing process wherein it is necessary to change the temperature of a dye bath during a portion of the process in accordance with a schedule encoded on a program carrier 4, as explained in detail hereinafter. In this same process certain valves in the processing machine must be opened or closed from time to time, and some of such valve operations must occur during the phase which includes the temperature program just mentioned while others must take place thereafter. The valve operation program is also encoded on the program carrier 4.

Referring now more particularly to the accompanying drawings, the program carrier 4 is shown as a rectangular card or plate made of a relatively hard but flexible material of uniform thickness, such as polyvinyl chloride, and having indicia in the form of uniform holes 5 that are punched through the card. It will be understood that any other known type of program carrier could be used with the apparatus of this invention, as for example a magnetic tape or a transparent film having opaque areas which comprise the indicia. The punched card program carrier 4 is preferred because it is inexpensive, readily prepared, and can be easily checked to ascertain whether the program encoded on it conforms with that which has been specified.

In the operation of the apparatus, the program carrier is moved lengthwise in one direction by feed means 6 to progress it through a reader 7 by which the indicia on the program carrier are translated into control impulses.

As shown (see FIGURE 1), the feed means 6 comprises a table 8 having a pair of spaced apart parallel rails 9 extending along opposite sides of its top to engage the side edges of the program carrier 4 and define a guideway along which the program carrier is lengthwise slidable. A sprocket 10 projects through each of a pair of slots 11 in the table top, one inwardly adjacent to each of the rails, to have driving engagement with a lengthwise extending row of sprocket holes 12 along each side of the program carrier. The two sprockets 10 are of course constrained to rotate in unison, and can comprise integral radially projecting teeth on opposite ends of a roller 13, as shown.

The sprocket roller 13 is driven from a synchronous motor 14 through speed reducing transmission means 15 of known type which provides for rotation of the sprockets at one or the other of two different speeds, depending upon the condiition of a transmission control instrumentality 16, and which also provides for manually controlled disconnection of the motor 14 from the sprocket roller.

As the sprocket roller turns, it drives an indicator knob 17 through bevel gears 18, and a scale 19 on the knob, calibrated in minutes or other time units, cooperates with a suitable fixed reference mark on the table to provide a visible indication of the stage in the process that has been reached by the control apparatus. The knob 17 can also be used for manually rotating the sprocket roller 13 to facilitate insertion of a program carrier into the feed mechanism, or to enable the program carrier to be advanced or retracted so that a step in a process can be skipped or repeated. For such manual rotation of the sprocket roller the knob is provided with a coaxial outwardly biased pushbutton 20 which is operatively connected in a known manner with the transmission means 15 through which the motor 14 drives the sprocket roller 13. When manually depressed, the pushbutton disconnects the motor from the sprockets. When the push-button is released, the driving connection between the motor and the sprocket roller is of course automatically restored.

The reader 7 comprises a plurality of microswitches 21 and 21' which are mounted above the table in two rows that parallel the axis of the sprocket roller 13. The two rows are slightly spaced apart along the length of the table, and the switches in each row are laterally spaced apart by uniform distances. Each microswitch 21 in one row is paired with a microswitch 21' in the other row, and the two microswitches of each pair are spaced apart laterally by a small distance, so that the microswitches as a group are arranged along a zigzag line.

Each microswitch has a downwardly projecting plunger-like actuator 22 near one end thereof, and the switch is mounted for bodily adjustment to carry the tip of its plunger toward and from the table top. For such mounting, two rods 23, one for each row of switches, are fixed above the table with their axes parallel to that of the sprocket roller, and each switch has a transverse hole through its body, spaced from its plunger, through which its rod extends to support the switch for bodily swinging motion. The microswitch is biased to swing upwardly about its rod 23, into engagement with a set screw 24, by means of a compression spring 25 reacting between the body of the switch and a plate 27 fixed above the table top. The spring 25 surrounds the actuator 22 of its switch with a substantial clearance and is received in a substantially deep upwardly opening well 28 in the plate 27 to be held thereby against lateral deflection. The set screws 24 are threaded through a plate 29 that is fixed above the plate 27, and it will be apparent that the distance between the table top and the tip of the actuator 22 of each microswitch can be very accurately established by adjustment of the set screw for the switch.

For each of the mircoswitch 21 in one row there is a lever arm 30 which has one of its ends pivotally carried by a fulcrum shaft 31 that extends parallel to the sprocket roller axis. The other end of the lever arm abuts the tip of its switch actuator 22 through a hole in the plate 27 that is concentric with the well 28. Intermediate its ends each lever arm 30 has a downwardly projecting pin or probe 32 which is adapted to drop down into any punched hole 5 in the program carrier that comes into alignment with it. Such downward motion of the probe 32 of course causes the lever arm 30 to which it is attached to move the actuator 22 of its associated switch from one to the other of its positions. In a similar manner each of the microswitches 21' in the other row is actuatable by means of a lever arm 30' which is swingable about a fulcrum shaft 31'.

The lever arms are so proportioned that the leverage of the arms 30 is the same as that of the arms 30'; that is, the distance between the probe 32 and the fulcrum axis bears the same ratio to the distance between the fulcrum axis and the actuator in lever arms 30 as in lever arms 30'. Hence every switch actuator 22 will move through the same distance for a given movement of the probe 32 on its lever arm.

Attention is directed to the fact that all of the probes 32, on both the arms 30 and the arms 30', are aligned in a row which extends parallel to the axis of the sprocket roller 13 and which is preferably directly above said axis.

The actuators 22 of microswitches 21 and 21' are of course movable between defined open ("off") and closed ("on") positions. Preferably all of the switches 21 in one row are of the normally open type, while all of the switches 21' in the other row are of the normally closed type; hence each normally open switch is paired with a normally closed switch. Every switch is intended to be moved out of its normal position only momentarily, whenever its associated probe 32 drops down into a punched hole 33 in the lengthwise moving program carrier.

Conductors 34 and 35 are connected to the terminals of each microswitch 21 to connect it in the control circuit described hereinafter, and conductors 36 and 37 are similarly connected to the terminals of each microswitch 21'.

The processing machine (see FIGURE 4) which the apparatus of this invention is intended to control is illustrated as comprising a closed chamber 40, the lower portion of which comprises a vat 40' for holding liquid medium and which has a cloth winding reel 41 mounted in its upper portion and rotatably driven by an electric motor 42. A hot water duct 43 and a cold water duct 44 are connected to the inlet sides of an adjustable mixing valve 45, and another duct 46 communicates the outlet of the mixing valve with the interior of the vat. On-off valves 47 and 48, in the hot and cold water ducts respectively, are intended to be operated in unison to either permit or block flow of water to the mixing valve. Chemicals can be fed into the vat from storage vessels 49 and 50 which are respectively communicated with the vat by means of ducts 51 and 52 that are controlled by on-off valves 53 and 54. Branch ducts 55 and 56 from the hot water line, controlled by on-off valves 57 and 58, open into the storage vessels to provide for rinsing them. The rinse effluent can flow to the vat through the ducts 51 and 52, and the vat is provided with a drain outlet 59 that is controlled by an on-off valve 60.

A steam line 61 provides a source of heated medium for raising the temperature of the air and/or liquid in the dye chamber. The steam line has one branch 62 which is controlled by an on-off valve 63 and which has its outlet 64 in the upper portion of the dye chamber. Another branch 65 of the steam line, which has its outlet 66 in the vat 40', is controlled by an adjustable valve 67; hence the position of adjustment of the valve 67 substantially governs the rate at which temperature of liquid in the vat increases.

To prevent the vat from being filled above a predetermined level and/or emptied below a certain level, the dye chamber can be provided with one or more float controlled switches 68 which can be connected in a known manner with the control apparatus to override the same or otherwise cooperate with the instrumentalities that control the various valves.

The control apparatus (see FIGURE 3) which governs the operation of the machine just described in accordance with the program encoded on the program carrier 4 comprises a plurality of relays 70, one for each pair of microswitches 21 and 21' in the reader 7. Each relay controls two or more two-position switch elements 71, 72, 73. In each instance the switch element 71 is connected in a self-holding circuit for its relay, which circuit also includes the microswitches 21 and 21' for that relay.

When one of the normally open microswitches 21 is momentarily closed, it connects one winding terminal 75 of the relay that it controls with one side 76a of a pair of mains 76a and 76b, such connection being made by way of the conductors 34 and 35. The other terminal 77 of the relay winding is connected by conductor means 78 with the other main 76b to complete an energizing circuit through the relay winding. The conductor means 78 may include a normally closed microswitch 21''. As soon as the relay winding is energized, the relay shifts its switch element 71 from its normal open to its closed position, thereby completing a holding circuit between winding terminal 75 and main 76a. The holding circuit comprises a conductor 79 connected between terminal 75 and switch element 71, and the microswitch 21' and its conductors 36 and 37, which are series connected between switch element 71 and main 76a.

The relay will of course remain energized, following closure of its normally open microswitch 21, until its normally closed microswitch 21' is subsequently opened. If the normally closed microswitch 21'' is provided in the conductor means 78, all of the energized relays connected with microswitch 21'' can be de-energized simultaneously by the opening of that switch.

It will be apparent that every relay 70 constitutes a binary control element which is always in either an operative (energized) or inoperative condition, and that the condition of each relay can at any time be altered by actuation of the appropriate one of its controlling microswitches 21 and 21'. The indicia 4 on the program carrier provide for such alteration of the control relays at scheduled times, as explained in more detail hereinafter.

As illustrated, the several relays 70 are arranged in two groups designated 170 and 270.

The relays in group 170 are intended to control operations of the on-off type, such as the opening and closing of valves and the starting and stopping of motors. Thus each of the on-off water valves 47 and 48, each of the chemical flow control valves 53 and 54, each of the hot water rinse valves 57 and 58, and the drain valve 60, has its own relay in the group 170, and is actuated by a solenoid 80 or the like that is connected with its relay to be controlled thereby. Hence each of the on-off valves is always in the condition that corresponds to the condition of its particular relay, as will be readily understood by those skilled in the art.

The reel drive motor 42 is likewise under the control of one of the relays in the group 170, in this case the left hand relay in FIGURE 3.

Another of the relays in the group 170 can comprise the transmission control instrumentality 16 which causes the program carrier 4 to progress through the reader 7 at either a fast rate or a slow rate in accordance with feed rate indicia encoded on the program carrier.

The relays comprising the relay group 270 cooperate to control changes in a variable characteristic of a medium, in this case the temperature of the dye bath in the vat 40'.

In general, there is an output producing element 84 for each of the relays in relay group 270, and each of said relays serves to render its output producing element either operative or inoperative, depending upon the condition of the relay. The several output producing elements 84 cooperate to produce a demand value signal which is fed to a comparator 85 (see FIGURE 4). In the comparator the demand value signals are compared with signals from a feedback element 86 in the dye vat, and an error signal is produced which corresponds to the difference between the demand value signal and the feedback signal. The error signal is fed, through an amplifier 105, to servos 87 and 87' which are mechanically connected with the mixing valve 45 and the steam valve 67, respectively, to control the adjustments of those valves. Each of the servos 87 and 87' functions in a known manner to open or close the valve that it actuates, in such a manner as to cause the difference between the demand value and the feedback signals to approach zero. Hence valves 45 and 67 will be positioned in accordance with the difference between the actual temperature obtaining in the dye bath and the demand temperature called for by the indicia on the program carrier that were last presented to the reader.

In this instance each of the output producing elements 84 comprises a fixed resistor, and the several resistors 84 have resistance values which differ from one another in accordance with the terms of a geometrical progression. Thus reading from left to right in FIGURE 3, the resistors 84 have values, respectively of 0.5, 1, 2, 4, 8, 16 and 32 ohms. In addition, a fixed 100-ohm resistor 89 is at all times connected in the demand value output circuit. Hence by various combinations and permutations of operative and inoperative resistance elements 84, any desired resistance value from 100 ohms to 163.5 ohms, in steps of 0.5 ohm, can be included in the demand value output circuit.

The feedback element 86 comprises a thermometer of known type having an electrical resistance which varies linearly with temperature. In this case the feedback element can be a nickel sensor having a resistance of 100 ohms at 0° C. and of 123 ohms at 40° C.

The comparator 85 can be a generally conventional bridge circuit, and its output or error signal will constitute a voltage which depends upon the relative values of resistance in the thermometer 86 and in the resistance chain comprising the several output producing elements 84 and the 100-ohm resistor 89.

The condition of any particular relay in the two groups 170 and 270 is always dependent upon the schedule encoded on the program carrier 4. To facilitate its preparation and checking, the program carrier is marked with transversely extending time lines 90 and with lengthwise extending "function" columns 91, each divided into "on" and "off" subcolumns 92 and 93.

The transverse time lines 90 are spaced apart by distance intervals determined by the rate at which the program carrier is advanced through the feeder. As shown, they are disposed at one-minute intervals, that is, they are so spaced along the length of the program carrier that successive lines 90 normally pass beneath the row of probes 32 at one-minute intervals.

Each of the function columns 91 corresponds to one of the relays 70 in the control apparatus, hence a hole appearing in the "on" subcolumn 92 for a particular function actuates the normally open microswitch 21 for the relay which controls that function. The relay then remains energized until the reader detects a hole on a subsequent time line in the "off" subcolumn 93 of the same function column, whereupon the "off" hole actuates the normally closed microswitch 21' associated with that relay.

The left hand group of columns of the program carrier relates to functions of the on-off type, and thus the indicia in those columns control the relays in group 170. The right hand group of columns on the program carrier contains coded indicia for temperature demand values, and each right hand column therefore corresponds to a demand value increment produced by one of the fixed resistors 84.

As a specific example of a program to be accomplished by means of the herein described apparatus, assume that during the first six minutes of a process, liquid in the vat 40' is to be steadily raised to 40° C. from a normal cold temperature which is slightly below about +10° C., and that the liquid is too be held at the 40° temperature during the next three minutes. For a substantially uniform rate of temperature rise, therefore, the temperature of the liquid can be brought up to 10° C. in the first minute and raised 6° C. per minute during each of the next five minutes.

For this temperature program the following information is encoded on the program carrier:

| Time, Min. | Demand Value, °C. | Total Resistance, Ohms |
|---|---|---|
| 1 | 10 | 105.5 |
| 2 | 16 | 109 |
| 3 | 22 | 112.5 |
| 4 | 28 | 116 |
| 5 | 34 | 110.5 |
| 6 | 40 | 123 |

The particular resistance values shown in this table correspond to the resistance values of the feedback thermometer 86 at the listed temperatures.

In each instance the resistor 89, which is permanently connected in the demand value output circuit, provides 100 ohms of fixed resistance, and consequently so much of the value in the "Total Resistance" column as is in excess of 100 ohms must be connected into the demand value output circuit to provide the total resistance for the required demand value. Thus during the first minute the 0.5-ohm, 1-ohm and 4-ohm resistance elements 84 must be rendered operative, and accordingly holes are punched, along the one-minute line, in the "on" subcolumns of the columns corresponding to those resistance values.

During the second minute a total demand value increment of 9 ohms is required, and therefore holes are punched along the two minute line in the "off" subcolumns of the 0.5-ohm and 4-ohm columns and in the "on" subcolumn of the 8-ohm column. During the second minute the 1-ohm resistor is to remain operative, so no hole appears in the column for that element.

During the third minute the total demand value increment is 12.5 ohms, and therefore along the three-minute line holes are punched in the "off" subcolumn of the 1-ohm column and in the "on" subcolumns of the 0.5-ohm and 4-ohm columns. The 8-ohm element is to remain operative through the third minute and therefore no hole appears in the 8-ohm column along the three-minute line.

In a similar manner the remainder of the schedule for the first six minutes is encoded on the program carrier, as shown in FIGURE 2. The demand value obtaining during the sixth minute is maintained during the seventh, eighth and ninth minutes, to provide the required three-minute duration of the 40° C. temperature, and consequently no holes appear in the temperature control columns for those three minutes.

At the tenth minute all temperature control resistors are to be rendered inoperative, and consequently holes appear in the "off" subcolumns of all temperature columns, although it will be recognized that the "off" holes in the 0.5-ohm, 8-ohm and 32-ohm columns are actually superfluous. Alternatively if a microswitch 21" is provided that is in circuit with all of the relays in the group 270 that control resistance elements, a single hole in a column corresponding to that microswitch will have the effect of rendering all of the resistance elements inoperative.

FIGURE 5 shows how the apparatus responds to the above described temperature program. The heavy stepped line shows the demand value temperatures that are scheduled on the program carrier during the nine-minute phase of the process discussed above, and the lighter line shows the actual temperature of the liquid in the dye vat during that period.

From the foregoing example it will be apparent that the change of temperature of the dye bath liquid could be programmed for any desired rate by suitable scheduling of the time intervals between different demand values and proper selection of demand value increments.

It will be appreciated that the circuit for the resistance elements 84 must always provide for the connection of the operative elements 84 in series with one another and with the 100-ohm resistor 89, so that the demand value output will correspond to the sum of the elements 84 which are operative. Such connections are provided for by a double-throw switch element 72 in each of the relays 70 of the group 270. When its relay is unenergized, the switch element 72 engages a terminal 96 that is connected by conductors 97 and 98, respectively, with one side of its associated resistance element 84 and with the center terminal 99 of the switch element 72 of its adjacent relay. Hence in the unenergized condition of its relay each switch element 72 provides a short circuiting connection around its associated resistance element 84 and provides a series connection between the switch elements 72 of its adjacent relays. When any relay in the group 270 is energized, its switch element 72 engages another terminal 100 that is connected with its associated resistance element 84 by means of another conductor 101. The fixed 100-ohm resistor 89 is connected with the center terminal 99 of switch element 72 of the first relay in group 207, and hence is always operative in the circuit.

It will be understood that the left-hand function columns of the program carrier 4 are intended for control of the various on-off instrumentalities of the machine, and consequently holes appearing in those columns alter the conditions of relays in group 170. Thus, one of the left-hand columns may be devoted to the control of the hot and cold water valves 57 and 58, which are always actuated simultaneously. Another of the columns in the left-hand group can be devoted to control of the feeder 6, to designate whether it shall run at its fast or its slow speed. Preferably the slow speed is in a simple ratio to the fast speed, so that when the program carrier is being advanced at slow speed the distance between adjacent time lines corresponds, for example, to four minutes instead of one minute. Slow feed would be programmed onto the card whenever the program calls for a long time interval between changes, and in this manner the length of the program carrier can be kept substantially short.

From the foregoing description taken together with the accompanying drawings it will be apparent that this invention provides process control apparatus wherein a punched card or similar program carrier can be used for the control of the usual on-off functions and also for controlling changes in a variable characteristic of a medium in accordance with a schedule encoded on the program carrier in binary indicia.

What is claimed as our invention is:

1. Apparatus for so controlling changes in a variable characteristic of a medium during a predetermined time period as to cause said characteristic to attain predetermined values at predetermined times during said period in accordance with a schedule encoded on a program carrier in binary indicia that can be substantially uniform in all respects except location on the carrier, said apparatus comprising:
    (A) controllable means for producing the characteristic to be controlled at each of a plurality of different rates;
    (B) a plurality of control instrumentalities operatively associated with said controllable means,
        (1) each of said control instrumentalities having an operative condition and an inoperative condition and being responsive to a momentary signal to be altered from each of its conditions to the other, and
        (2) each of said control instrumentalities when in its operative condition being cooperable with said controllable means to effect a different rate of production of said variable characteristic of the medium;
    (C) feed means for continuously moving the program carrier in one direction at a rate which establishes the time intervals at which successive indicia along the motion direction of the program carrier pass a fixed point;
    (D) a pluarlity of signal generating means, one for each of said control instrumentalities, each responsive to indicia on a program carrier at a different location thereon transversely to its direction of motion to produce a momentary signal as each such indicium passes said fixed point; and
    (E) means operatively connecting each signal generating means with its control instrumentality for effecting alteration of the condition of the control instrumentality in response to each momentary signal produced by the signal generating means.

2. The apparatus of claim 1, wherein each of said control instrumentalities comprises a demand value output producing element, each of said elements being capable when in its operative condition of producing a demand value output corresponding to a different predetermined increment value of the characteristic, said apparatus being further characterized by:
    (A) feedback means for detecting the instantaneous value of the characteristic and producing a feedback output corresponding thereto;
    (B) comparator means connected with the feedback means and with all of the demand value output producing elements for comparing feedback output with the demand value output produced by the elements in operative condition and for producing a control output corresponding to the difference between feedback and demand value outputs; and
    (C) servo means connected with the comparator means to be responsive to the control output therefrom, and operatively associated with the controllable means to establish the instantaneous rate at which the characteristic is produced.

3. The apparatus of claim 2 further characterized by:
    (A) each of said demand value output producing elements comprising a resistor of predetermined fixed value; and
    (B) said feedback means comprising a resistance element having a resistance that varies in a predetermined relationship to changing values of said characteristic.

4. The apparatus of claim 1, further characterized by:
    (A) each of said control instrumentalities comprising
        (1) a relay,
        (2) means defining an energizing circuit for said relay, and
        (3) means defining a holding circuit for said relay by which the relay tends to maintain itself connected in the energizing circuit in consequence of its being energized; and
    (B) each of said signal generating means comprising
        (1) a normally open momentary contact switch connected in said energizing circuit for the relay to effect energization of the same in consequence of closure of said normally open switch, and
        (2) a normally closed momentary contact switch connected in said holding circuit for the relay to effect de-energization of the relay in consequence of momentary opening of said normally closed switch.

(References on following page)

References Cited

UNITED STATES PATENTS

| | | |
|---|---|---|
| 2,715,703 | 8/1955 | Schuck. |
| 2,775,727 | 12/1956 | Kernahan et al. |
| 2,881,832 | 4/1959 | Leonard _____ 307—41 |
| 2,927,258 | 3/1960 | Lippel. |
| 3,068,390 | 12/1962 | Lichtenfels et al. __ 307—112 X |

ORIS L. RADER, *Primary Examiner.*

T. B. JOIKE, *Assistant Examiner.*